(12) United States Patent
Roman

(10) Patent No.: US 12,050,039 B1
(45) Date of Patent: Jul. 30, 2024

(54) AIRCRAFT MEMBRANE DEHYDRATION COOLING ARCHITECTURE

(71) Applicant: Government of the United States, as represented by the Secretary of the Air Force, Wright-Patterson AFB, OH (US)

(72) Inventor: Abdeel Roman, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 321 days.

(21) Appl. No.: 17/705,586

(22) Filed: Mar. 28, 2022

Related U.S. Application Data

(60) Provisional application No. 63/176,942, filed on Apr. 20, 2021.

(51) Int. Cl.
| | |
|---|---|
| *F25B 43/00* | (2006.01) |
| *B01D 53/26* | (2006.01) |
| *B64D 27/10* | (2006.01) |
| *B64D 33/08* | (2006.01) |
| *F25B 9/00* | (2006.01) |
| *F25B 9/06* | (2006.01) |

(52) U.S. Cl.
CPC .......... *F25B 43/003* (2013.01); *B01D 53/265* (2013.01); *B01D 53/268* (2013.01); *B64D 27/10* (2013.01); *B64D 33/08* (2013.01); *F25B 9/004* (2013.01); *F25B 9/06* (2013.01)

(58) Field of Classification Search
CPC .......... F25B 43/003; F25B 9/004; F25B 9/06; B01D 53/265; B01D 53/268; B64D 27/10; B64D 33/08
See application file for complete search history.

(56) References Cited

U.S. PATENT DOCUMENTS

| | | | |
|---|---|---|---|
| 9,266,803 B2 | 2/2016 | Vane et al. | |
| 2018/0127110 A1* | 5/2018 | Cordatos | ................ B64D 37/32 |

* cited by examiner

*Primary Examiner* — Elizabeth J Martin
(74) *Attorney, Agent, or Firm* — AFMCLO/JAZ; Matthew D. Fair

(57) ABSTRACT

A unique cooling system for an aircraft is designed to provide extremely low temperature cooling airflow. The system includes an air source, a first system compressor and a second system compressor positioned in series for compressing and heating the air. A least one heat exchanger can be used to cool the air at predefined locations. A condenser for condensing water out of the air is positioned downstream of the second compressor. The water can be removed with a water separator and at least a portion of any remaining water in the form of liquid or vapor is removed from the air in a membrane dehydration device. The air is expanded in at least one system turbine to bring the air temperature to a subfreezing temperature. The subfreezing air is then used to cool electronic components and mechanical components within the aircraft.

24 Claims, 3 Drawing Sheets

AIRCRAFT MEMBRANE DEHYDRATION COOLING ARCHITECTURE

Pursuant to 37 C.F.R. § 1.78(a)(4), this application claims the benefit of and priority to prior filed Provisional Application Ser. No. 63/176,942, filed Apr. 20, 2021, which is expressly incorporated herein by reference

RIGHTS OF THE GOVERNMENT

The invention described herein may be manufactured and used by or for the Government of the United States for all governmental purposes without the payment of any royalty.

TECHNICAL FIELD

The present disclosure generally relates to a cooling system and more particularly, but not exclusively to an aircraft cooling system with membrane dehydration cooling.

BACKGROUND

Some cooling systems require extremely low operating temperatures to effectively cool certain components. Such cooling systems can be employed in aircraft, other vehicles and even land based structures. In aircraft, ambient air is brought on board and used to cool various systems. Some systems or components on aircraft require air to be cooled to extremely low temperatures. However, water vapor in the air prevents cooling the air below freezing (32° F.) because ice will form and potentially cause problems such as clogging cooling passageways or the like. Some prior art cooling systems have been designed to remove water from the air, but these systems typically can discharge up to 50% of the air out of the aircraft. Dumping air from an aircraft is an inefficient and thermodynamically expensive method for removing water from the cooling air. Other existing cooling systems have various shortcomings, drawbacks, and disadvantages relative to certain applications. Accordingly, there remains a need for further contributions in this area of technology.

SUMMARY

One embodiment of the present disclosure includes a unique cooling system for an aircraft or other devices designed to provide extremely low temperature cooling flow. Other embodiments include apparatuses, systems, devices, hardware, methods, and combinations wherein water is removed from ambient air to prevent freezing of the water during the cooling process. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
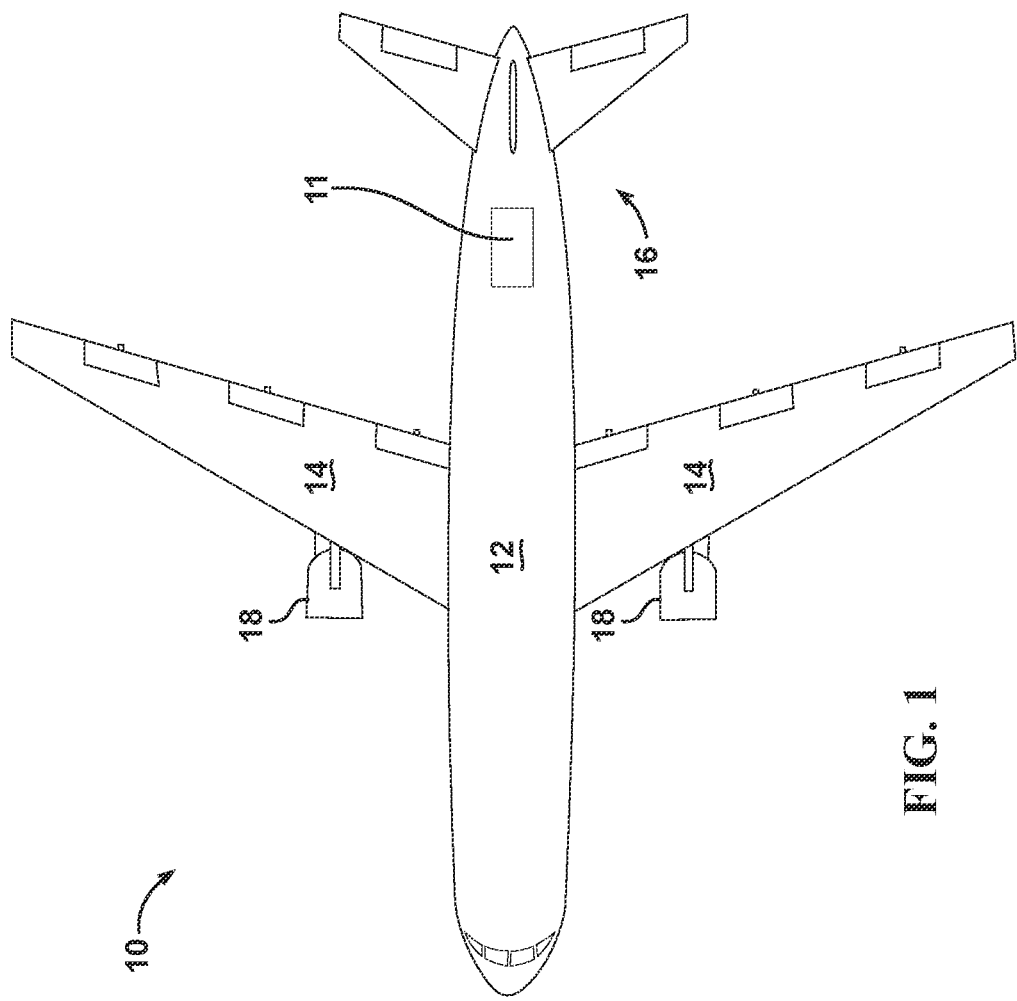
FIG. 1 is a schematic view of an exemplary aircraft with cooling system according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, there are illustrated some aspects of a non-limiting example of an aircraft 10 that may be operable with a cooling system 11 as will be described in detail below. In various forms, the aircraft 10 may be manned, unmanned and/or autonomous in operation. It should be understood that in other forms, the cooling system 11 may be used in other types of vehicles, devices, or land based structures.

The exemplary aircraft 10 includes a fuselage 12, wings 14, an empennage 16 and a primary power system 18 in the form of a pair of gas turbine engines. The aircraft 10 may have only a single engine as a primary power source or a plurality of propulsion engines as a primary power source. The cooling system 11 may be used in conjunction with the aircraft 10 and the primary power system 18. The cooling system 11 may be positioned in the empennage 16 as illustrated, however it should be understood that the location of the cooling system 11 is not limited as such. For example, the cooling system 11 may extend throughout other portions or even throughout the entire aircraft fuselage 12. In some forms, the cooling system 11 may be operationally coupled to the primary power system 18. For example, pressurized bleed air, electrical power and control signals may be diverted or transmitted between the primary power system 18 and the cooling system 11 respectively. However, in other forms the cooling system 11 may be partially or wholly operationally independently from the primary power system 18.

Figure 2:
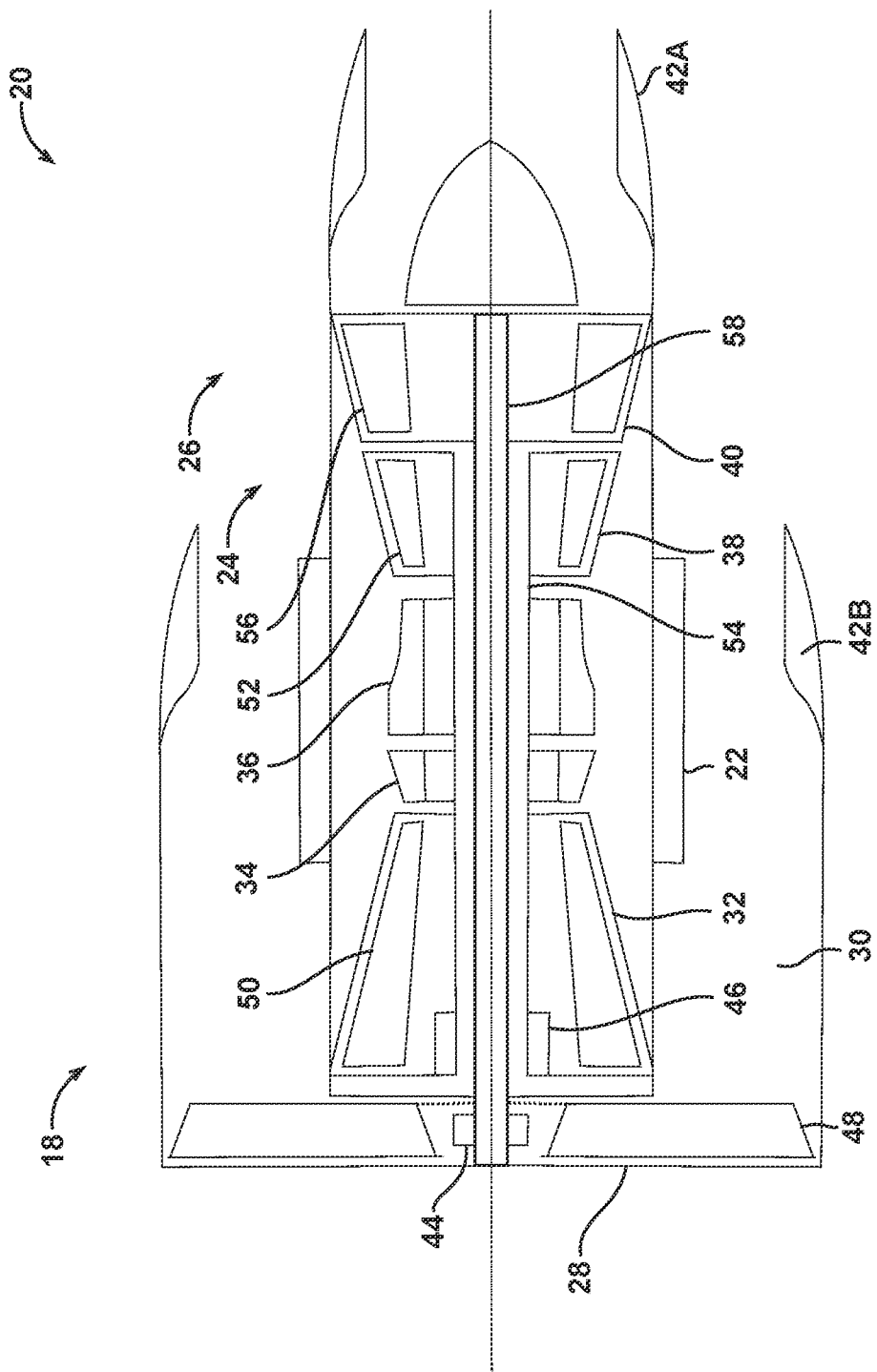
FIG. 2 is a schematic cross sectional view of a gas turbine engine that may be used as a primary power source for the aircraft of FIG. 1.

Referring to FIG. 2, there are illustrated some aspects of a non-limiting example of a primary power propulsion system 18 in accordance with an embodiment of the present invention. The propulsion system 18 can include a gas turbine engine 20 that functions as a main power source, i.e., main propulsion engine. The propulsion system 18 can also include an auxiliary power unit 22 that is operably connected to the cooling system apart from the gas turbine engine 20. The auxiliary power unit 22 can supply electrical power to pumps, valves, batteries, capacitors and other electronic components in the cooling system 11. In other forms all of the electrical power is generated by the primary propulsion system 18.

As is conventional with aircraft operation, propulsive thrust is provided by propulsion system 18 for the aircraft 10. The primary power source can include a propulsive force that may be generated by one of a number of different means, for example and without limitation, one or more turbofans, propellers, turbines, prop fans and/or other rotor systems that generate thrust. Alternatively the power output from the primary power source may also be converted to other mechanical means to provide motive power to land-based vehicles or water vessels as would be understood by one skilled in the art.

In the exemplary form, the gas turbine engine 20 includes a high pressure (HP) spool 24 and a low pressure (LP) spool 26. In other embodiments, the engine 20 may include three or more spools, e.g., may include an intermediate pressure (IP) spool and/or other spools. In the illustrated form, the engine 20 is a turbofan engine, wherein LP spool 26 is operable to drive a turbofan 28. In other embodiments, the engine 20 may be a turboprop engine, wherein the LP spool 26 powers a propeller system (not shown), e.g., via a reduction gearbox (not shown). In still other embodiments, the propulsion 28 may be a helicopter rotor or tilt-wing aircraft rotor.

The gas turbine engine 20 can include a bypass duct 30, a compressor system 32, a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. Pressurized bleed air may be ducted from any location upstream of the combustion system 36. The gas turbine engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. In other embodiments, the gas turbine engine 20 may also include an electrical machine 44 coupled to LP spool 26, and an electrical machine 46 coupled to HP spool 24. The electrical machines 44 and 46 are configured to convert mechanical power to electrical power, and to convert electrical power to mechanical power, e.g., an electric motor/electric generator. In other embodiments, one or both of electrical machines 44 and 46 may be configured to only convert mechanical power into electrical power, e.g., an electrical generator. In still other embodiments, one or both of electrical machines 44 and 46 may be configured to only convert electrical power into mechanical power, e.g., an electric motor. In one form, both electrical machine 44 and electrical machine 46 are configured to provide power to aircraft 10 during operation. In some forms, the electrical machines 44 and 46 may be mechanically and electrically coupled to the cooling system 11.

The fan system 28 includes a fan rotor system 48 driven by LP spool 26. In various embodiments, fan rotor system 48 includes one or more rotors (not shown) that are powered by turbine system 40. The fan system 28 may include one or more vanes (not shown). The bypass duct 30 is operable to transmit a bypass flow generated by fan system 28 around the core of engine 20. The compressor system 32 includes a compressor rotor system 50. In various embodiments, compressor rotor system 50 includes one or more rotors (not shown) that are powered by turbine system 38. The turbine system 38 includes a turbine rotor system 52. In various embodiments, turbine rotor system 52 includes one or more rotors (not shown) operable to drive compressor rotor system 50. The turbine rotor system 52 is drivingly coupled to compressor rotor system 50 via a shafting system 54. The turbine system 40 includes a turbine rotor system 56. In various embodiments, turbine rotor system 56 includes one or more rotors (not shown) operable to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. The turbine system 40 is operable to discharge the engine 20 core flow to the nozzle 42A.

Figure 3:
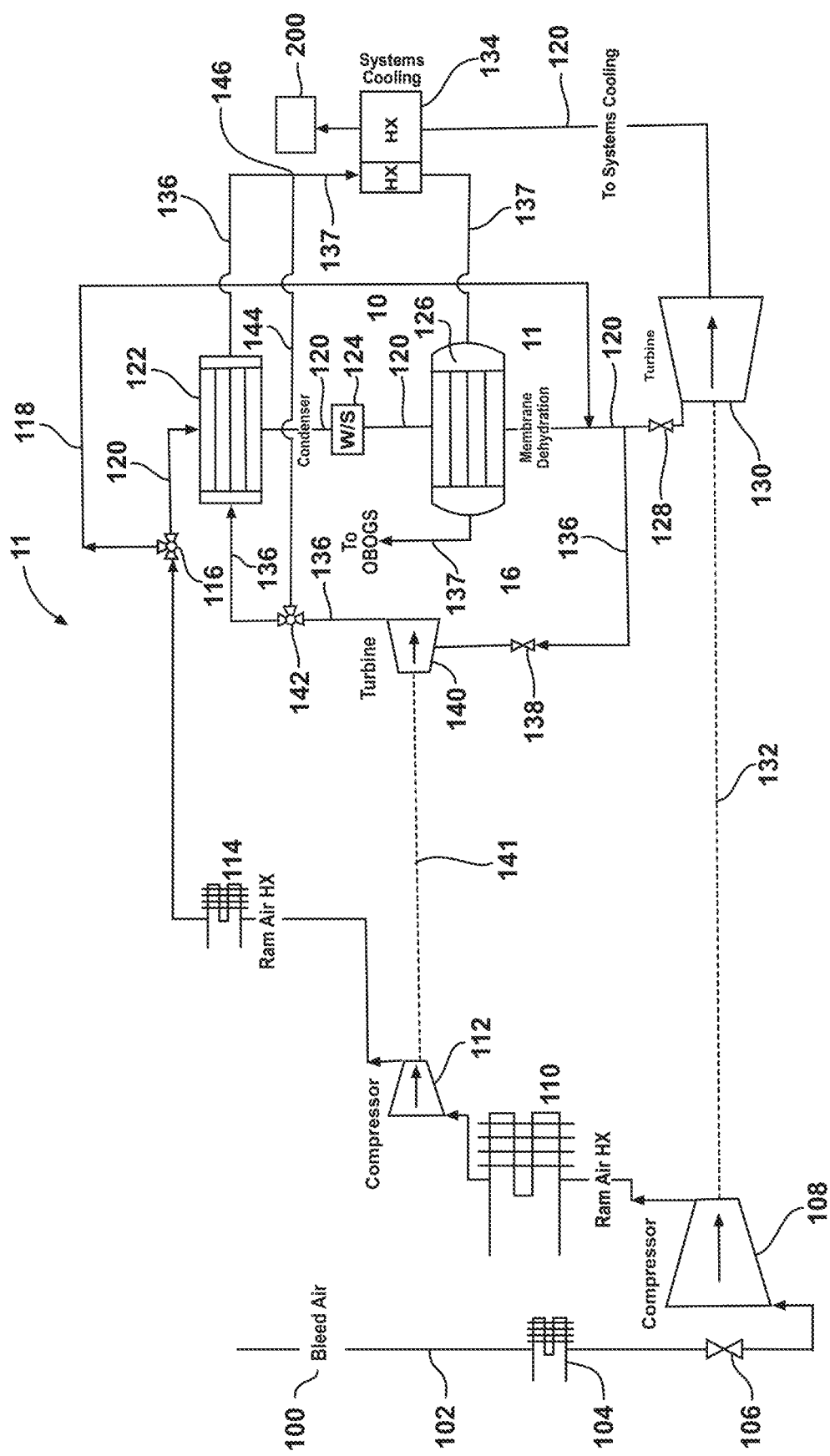
FIG. 3 is a schematic view of a cooling system according to one embodiment of the present disclosure.

Referring to FIG. 3, an illustrative schematic view of a cooling system 11 according to one exemplary embodiment of the present disclosure is depicted. The cooling system 11 can include cooling air 100 directed through a primary passageway 102 from an air source. In one form, the air source can be bleed air extracted from a gas turbine engine 20. In an alternate form, the air source may come directly from an intake port (not shown) on the aircraft. The air may be pressurized prior to being directed to the cooling system 11 in some embodiments via the gas turbine engine 20 and/or the auxiliary power unit 22. By way of example and not limitation, the bleed air may be extracted from the gas turbine engine 18 at 250° F. and 80 psi. The cooling air 100 can be directed to a first heat exchanger 104 to reduce the temperature thereof. As is known to those skilled in the art, heat exchangers include at least one relatively cool flowpath that is configured to receive heat through conduction heat transfer from at least one relatively hot flow path.

The cooling path in the first heat exchanger 104 can include ram air directed from the aircraft 10. In the exemplary embodiment the temperature of the cooling air 100 can be reduced to 85° F. after passing through the first heat exchanger 104. A control valve 106 can be positioned in the primary passageway 102 to control the mass flow rate of the cooling air 100 passing therethrough. A first system compressor 108 is in fluid communication with the cooling air 100 and is operable to further pressurize and heat the cooling air 100. In one exemplary form, the first system compressor 108 can increase the pressure to 160 psi and which increases temperature to 400° F.

After being compressed in the first system compressor 108, the cooling air can be directed through a second heat exchanger 110 where the temperature of the cooling air can be reduced to 180° F. in one form. A second system compressor 112 is positioned downstream of the second heat exchanger 110. The second system compressor 112 is operable for compressing the air to approximately 200 psi and increasing a temperature of 240° F. A third heat exchanger 114 is positioned downstream of the second compressor system 112. The third heat exchanger 114 can reduce the temperature of the air to approximately 100° F.

A second control valve 116 can be positioned downstream of the third heat exchanger 114. The second control valve 116 splits the air flow into a first pathway 118 and a second pathway 120 and controls the mass flow through each pathway 118, 120. The second pathway 120 transports air to a condenser 122 where the air is cooled to a temperature below the saturation temperature such that the vapor in the air is condensed into to liquid water. A water separator 124 can be located downstream of the condenser 122 along the second pathway 120. The water separator 124 is operable for removing a significant portion of the condensed water from the air as is known to those skilled in the art. After the condensed water is removed in the water separator 124, the air is transported to a membrane dehydration device 126 where any remaining water in the form of liquid or vapor is removed. The operation of the membrane dehydration device 126 will be further described below.

After the air is substantially or completely dried in the membrane dehydration device 126, the second pathway 120 directs the air to a third valve 128. The third valve 128 controls the air flow rate into a first system turbine 130 where the air is expanded and exits at a super cooled temperature of approximately −100° F. and a pressure of 17 psia. The first system turbine 130 is connected via a drive shaft 132 to the first system compressor 108. The super cooled air is then transported to a system heat exchanger 134 where it is used to cool aircraft subsystems.

A bypass air flow in a third pathway 136 tees off from the second pathway 120 downstream of the membrane dehydration device 126 just upstream of the third valve 128. The third pathway 136 carries a portion of the air that is diverted from the second pathway 120 to a fourth valve 138. The fourth valve controls the mass flow rate of the air passing through the third pathway 136. Air is transported to a second system turbine 140 downstream of the fourth valve 138. The second system turbine 140 can expand the air down to 50 psia and to a temperature of approximately −15° F. The second system turbine 140 is operably connected to the second system compressor 112 via a rotational shaft 141.

The air traverses from the second turbine system 140 to a fifth control valve 142. The fifth control valve 142 splits a portion of the air flow to a fourth pathway 144 with the balance continuing along the third pathway 136. The cooled air exiting the second turbine 140 enters the condenser 122 downstream of the fifth valve 142 through the third pathway 136. The cooled air in the third pathway 136 cools and condenses water from the relatively hot and moist air in the condenser 122 passing through the second pathway 120 as described above. Air from the fourth pathway 144 bypasses the condenser 122 and is recombined with the air exiting the condenser 122 through the third pathway 136 at a union 146, wherein a fifth pathway 137 is formed and extends downstream therefrom. The recombined flow in the fifth pathway 137 then enters the system heat exchanger 134 and is used in support of aircraft subsystem cooling. The air in the fifth pathway 137 then exits the system heat exchanger 134 and is directed to the membrane dehydration device 126. The air in the fifth pathway passes through the membrane dehydration device 126 and operates to dry out the membrane material so that the membrane material can continuously dry the air entering the membrane dehydration device 126 from the second pathway 120. The dehydration membrane device 126 includes of a bundle of selectively permeable hollow fibers, not shown, but will be readily understood by those skilled in the art. The permeable hollow fibers are configured to separate the feed air 126 into two streams: a permeated water vapor flow and a dry product airflow. The air in fifth pathway 137 sweeps the permeated water vapor as a gas out of the membrane dehydration device. The dry product airflow is discharged downstream of the membrane device 126 through the second pathway 120. After the air in pathway 137 passes through the membrane dehydration device 126 the air can then be directed to the onboard oxygen generating system (OBOGS) or to any other aircraft subsystems requiring bleed air.

In one aspect the present disclosure includes a cooling system for an aircraft comprising: a gas turbine engine having an engine compressor; an air bleed port fluidly coupled to the engine compressor; a primary air passageway fluidly coupled to the bleed port; a first heat exchanger positioned within the primary air passageway operable to cool pressurized bleed air from the engine compressor; a first system compressor operable to receive the cooled pressurized air from the first heat exchanger and further compress the bleed air; a condenser positioned downstream of the first system compressor, the condenser operable for condensing liquid water from the bleed air; a water separator positioned downstream of the condenser to remove water from the bleed air; a membrane dehydration device positioned downstream of the water separator, the membrane dehydration device operable for removing at least a portion of any remaining water in the form of liquid or vapor; and a system turbine positioned downstream of the membrane dehydration device, the system turbine operable for reducing the temperature of the bleed air below a subfreezing water temperature.

In refining aspects the present application further includes a first valve positioned between the first heat exchanger and the first system compressor; a second heat exchanger positioned downstream of the first system compressor; a second system compressor positioned downstream of the second heat exchanger; a third heat exchanger positioned downstream of the second compressor; a second valve positioned downstream of the third exchanger operable for splitting the primary passageway into a first pathway and a second pathway; wherein the second pathway directs a portion of the bleed air through the condenser; wherein the first pathway bypasses the bleed air past the condenser and the membrane dehydration device wherein the first pathway is reconnected to the second pathway downstream of the membrane dehydration device; a third valve positioned downstream of the membrane dehydration device operable to control an air mass flow rate entering the first system turbine; a third pathway split from the second pathway downstream from the reconnection location of the first and second pathways; a fourth valve in fluid communication with air flowing through the third pathway; a second system turbine positioned downstream of the fourth valve operable to cool air to below a subfreezing temperature a fifth valve positioned downstream of the second system turbine, the fifth valve operable for splitting off a portion of the air flow from the third pathway to a fourth pathway; wherein the third pathway extends through the condenser to provide cooling required to condense water from the air entering the condenser from the second pathway; wherein the fourth pathway bypasses the condenser and reconnects with the third pathway to form a fifth pathway downstream of the condenser; wherein air in the fifth pathway is directed through the system heat exchanger to cool aircraft subsystems; and wherein the fifth pathway extends though the membrane heat exchanger to dry membrane components and then exits to OBOGS or aircraft subsystems.

In another aspect, a cooling system comprises: an air source to provide cooling air to the cooling system; a first system compressor operable to pressurize the air; a second system compressor downstream of the first system compressor operable to further pressurize the air; a condenser positioned downstream of the second compressor operable to condense water from the air; a water separator positioned downstream of the condenser, the condenser operable to remove water from the air; a membrane dehydration device positioned downstream of the water separator, the membrane dehydration device operable to remove substantially all of the remaining water vapor remaining in the air; a first system turbine operable to receive dried air from the membrane dehydration device and expand and cool the air to a subfreezing temperature; and a system heat exchanger configured to receive the subfreezing air and cool a secondary airflow.

In refining aspects the cooling system includes a second system turbine operable to expand and cool air upstream of the condenser; a first control valve positioned upstream of the first system compressor; a second control valve positioned between the second system compressor and the condenser, the second valve configured to split air flow into first and second pathways that pass through and bypass the condenser, respectively; a third control valve configured to control an air flow entering the first system turbine; a fourth control valve configured to control an air flow entering the second system turbine; a fifth control valve operable to control air flow into the condenser and spit off a bypass flow around the condenser; a first heat exchanger positioned upstream of the first system compressor; a second heat exchanger positioned between the first and second system compressors; and a third heat exchanger positioned between the second compressor and the condenser.

In another aspect, the present disclosure includes a method comprising: providing air from an source; compressing the air in a first system compressor; cooling the air in a first heat exchanger downstream of the compressor; compressing the air in a second system compressor; cooling the air in a second heat exchanger downstream of the second system compressor; condensing water from the air in a condenser; removing water from the air in a water separator; removing additional water vapor from the air in a membrane dehydration device; expanding the air in a first system turbine to a subfreezing temperature; cooling secondary air, electronic components and mechanical components with the subfreezing air. In refining aspects the air source is a gas turbine engine.

It should be understood that the temperature and pressures referenced in this application are for reference only so that the skilled artisan may have a feel for exemplary data in relative terms. In practice, the absolute temperatures and pressures in the inventive system may vary widely from those cited herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A cooling system for an aircraft comprising:
a gas turbine engine having an engine compressor;
an air bleed port fluidly coupled to the engine compressor;
a primary air passageway fluidly coupled to the bleed port;
a first heat exchanger positioned within the primary air passageway operable to cool pressurized bleed air from the engine compressor;
a first system compressor operable to receive the cooled pressurized air from the first heat exchanger and further compress the bleed air;
a condenser positioned downstream of the first system compressor, the condenser operable for condensing liquid water from the bleed air;
a water separator positioned downstream of the condenser to remove water from the bleed air;
a membrane dehydration device positioned downstream of the water separator, the membrane dehydration device operable for removing at least a portion of any remaining water in the form of liquid or vapor; and
a system turbine positioned downstream of the membrane dehydration device, the system turbine operable for reducing the temperature of the bleed air below a subfreezing water temperature.

2. The cooling system of claim 1, further comprising a first valve positioned between the first heat exchanger and the first system compressor.

3. The cooling system of claim 1, further comprising a second heat exchanger positioned downstream of the first system compressor.

4. The cooling system of claim 1, further comprising a second system compressor positioned downstream of the second heat exchanger.

5. The cooling system of claim 4, further comprising a third heat exchanger positioned downstream of the second compressor.

6. The cooling system of claim 5, further comprising a second valve positioned downstream of the third exchanger operable for splitting the primary passageway into a first pathway and a second pathway.

7. The cooling system of claim 6, wherein the second pathway directs a portion of the bleed air through the condenser.

8. The cooling system of claim 6, wherein the first pathway bypasses the bleed air past the condenser and the membrane dehydration device.

9. The cooling system of claim 8, wherein the first pathway is reconnected to the second pathway downstream of the membrane dehydration device.

10. The cooling system of claim 9, further comprising a third valve positioned downstream of the membrane dehydration device operable to control an air mass flow rate entering the first system turbine.

11. The cooling system of claim 9 further comprising a third pathway split from the second pathway downstream from the reconnection location of the first and second pathways.

12. The cooling system of claim 11 further comprising a fourth valve in fluid communication with air flowing through the third pathway.

13. The cooling system of claim 12 further comprising a second system turbine positioned downstream of the fourth valve operable to cool air to below a subfreezing temperature.

14. The cooling system of claim 13 further comprising a fifth valve positioned downstream of the second system turbine, the fifth valve operable for splitting off a portion of the air flow from the third pathway to a fourth pathway.

15. The cooling system of claim 14, wherein the third pathway extends through the condenser to provide cooling required to condense water from the air entering the condenser from the second pathway.

16. The cooling system of claim 14, wherein the fourth pathway bypasses the condenser and reconnects with the third pathway to form a fifth pathway downstream of the condenser.

17. The cooling system claim 16, wherein air in the fifth pathway is directed through the system heat exchanger to cool aircraft subsystems.

18. The cooling system of claim 16, wherein the fifth pathway extends though the membrane heat exchanger to dry membrane components and then exits to OBOGS or aircraft subsystems.

19. A cooling system comprising:
an air source to provide cooling air to the cooling system;
a first system compressor operable to pressurize the air;
a second system compressor downstream of the first system compressor operable to further pressurize the air;
a condenser positioned downstream of the second compressor operable to condense water from the air;
a water separator positioned downstream of the condenser, the condenser operable to remove water from the air;
a membrane dehydration device positioned downstream of the water separator, the membrane dehydration device operable to remove substantially all of the remaining water vapor remaining in the air;
a first system turbine operable to receive dried air from the membrane dehydration device and expand and cool the air to a subfreezing temperature; and
a system heat exchanger configured to receive the subfreezing air and cool a secondary airflow.

20. The cooling system of claim 19, further comprising a second system turbine operable to expand and cool air upstream of the condenser.

21. The cooling system of claim 20, further comprising:
a first control valve positioned upstream of the first system compressor;
a second control valve positioned between the second system compressor and the condenser, the second valve configured to split air flow into first and second pathways that pass through and bypass the condenser, respectively;
a third control valve configured to control an air flow entering the first system turbine;
a fourth control valve configured to control an air flow entering the second system turbine; and
a fifth control valve operable to control air flow into the condenser and spit off a bypass flow around the condenser.

22. The cooling system of claim 19, further comprising:
a first heat exchanger positioned upstream of the first system compressor;
a second heat exchanger positioned between the first and second system compressors; and
a third heat exchanger positioned between the second compressor and the condenser.

23. A method comprising:
providing air from an source;
compressing the air in a first system compressor;
cooling the air in a first heat exchanger downstream of the compressor;
compressing the air in a second system compressor;
cooling the air in a second heat exchanger downstream of the second system compressor;
condensing water from the air in a condenser;
removing water from the air in a water separator,
removing additional water vapor from the air in a membrane dehydration device;
expanding the air in a first system turbine to a subfreezing temperature;
cooling secondary air, electronic components and mechanical components with the subfreezing air.

24. The method of claim 23, wherein the air source is a gas turbine engine.

* * * * *